Figure 1A:
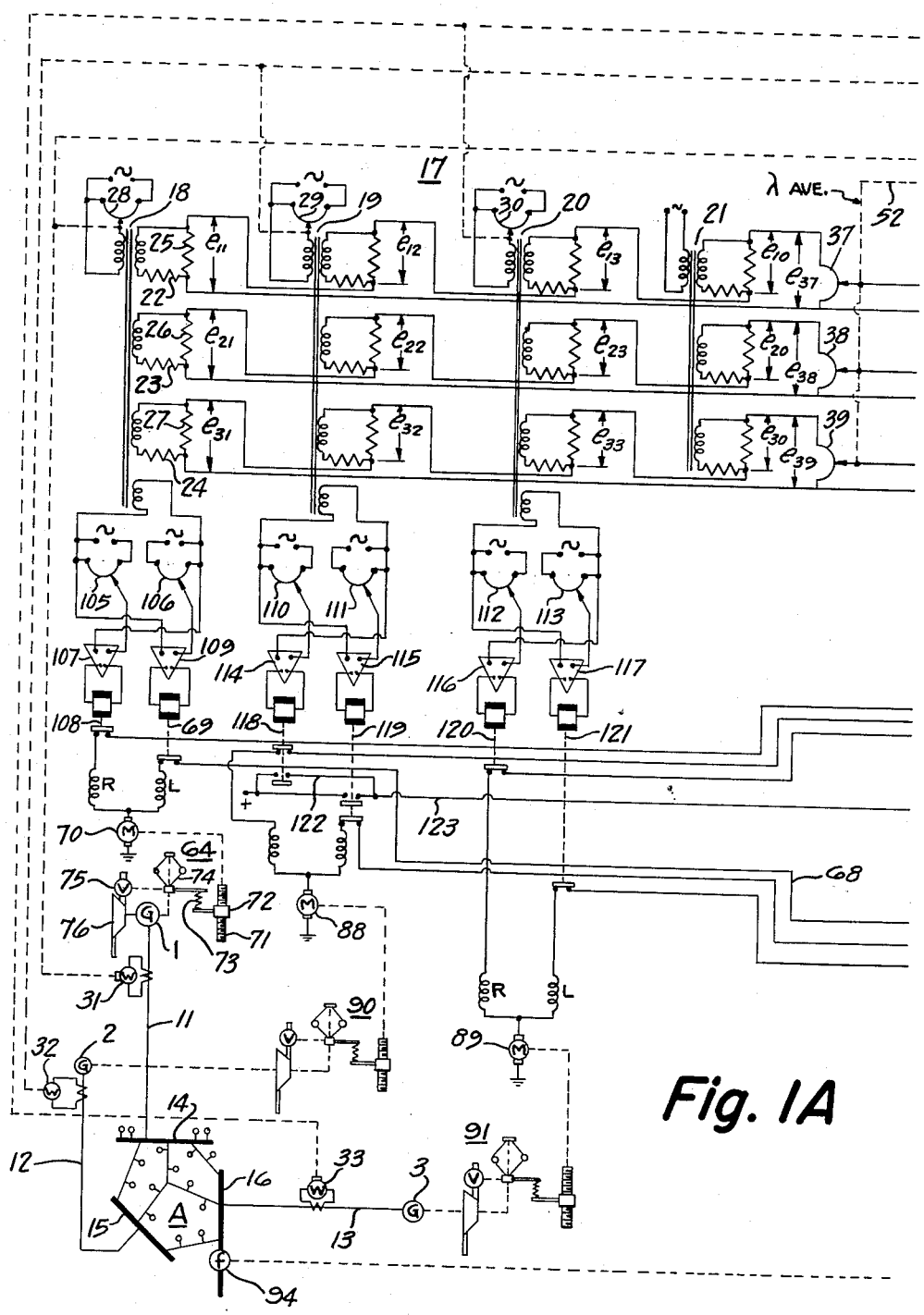

United States Patent Office 2,871,375
Patented Jan. 27, 1959

2,871,375

GENERATION CONTROL SYSTEM

Edwards D. Early, Birmingham, Ala.

Application November 21, 1957, Serial No. 697,900

10 Claims. (Cl. 307—57)

This invention has for an object the provision of means for loading interconnected generating stations forming an electrical power system so that the total cost of system generation (including losses) is a minimum, and has for a further object the provision of a reliable simplified system by means of which the generation of the respective power sources may be brought to values which yield minimum cost of operation of the system as a whole.

The present invention embodies many features disclosed and claimed in my parent applications, Serial No. 433,511, filed June 1, 1954, for "Economic Loading of Power Systems," issued as Patent No. 2,836,730, and Serial No. 697,359, filed Nov. 19, 1957, entitled "Computer Network for the Economic Loading of Power Sources."

In my parent applications I have explained at length the problems which have confronted utility engineers in determining the most economic loading of the several generating stations of a power system, and I have also disclosed certain systems providing methods and apparatus for determining the proper loading of the power sources, as well as automatic systems for maintaining the most economic distribution of the load among the power sources of the power system.

While in my parent applications I disclosed several modifications of computing networks and additional modifications illustrating the automatic control of generation at the several stations of the power system, something was left to be desired in the manner in which there may be achieved optimum division of generation.

In carrying out the present invention in one form thereof, there is provided a suitable means, such as a computing network, for generating a signal for each of a plurality of power sources representative of and varying with the quantity unity minus the incremental transmission losses. There is also provided for each of the power sources a means, or computing network, for producing a signal representative of and varying with the incremental cost of generation. These signals are utilized in conjunction with an equal-λ adjustable impedance, usually a slidewire resistor, for each said source to which one of the signals for that source is applied for obtaining a fractional signal. This fractional signal can either be a product of the quantity unit minus incremental transmission losses and a value of lambda, herein defined as the incremental cost of delivered power from a source to the load centers or the fractional signal can correspond with the signal varying with the incremental cost of generation divided by lambda. In either case, there is utilized a combining means, such as a circuit, for combining each said fractional signal with the other of said signals for each said source. In the combining circuit, the signal which varies with the incremental cost of generation has an instantaneous polarity or phase opposite to that of the signal varying with unity minus incremental transmission losses. The result is an output signal which is applied to an adding means.

The adjustable impedances are operated in response to the sum of said output signals and in a direction to reduce that sum to zero. In the system of the present invention the sum of said output signals can be reduced to zero prior to the time the generation of said sources has values which provide a lambda for each source which corresponds with an average value of lambda which will be the condition of most economic loading of the sources. The sum of the output signals may be reduced to zero since the adjustment of the equal-λ impedances will make some of the output signals positive and the others negative. Thus their average will be zero. When their average is zero, each adjustable impedance will have a value representative of the average lambda. By utilizing means responsive to the signals or voltages of said combining means, indications may be had of the direction of change of generation needed for each power source in order to bring its incremental cost of delivered power to the load nearer the average value of lambda for all sources. When $\lambda_m$ for each source is equal to the average lambda, $\lambda_{avg}$, they will be equal to each other and the condition for the most economic loading of the sources of power will be met.

In the preferred and illustrated form of the invention, control means are provided responsive to signal voltages developed across each combining means for routing raise and lower pulses or signals to the generation control for each power source for distribution of the load on the several power sources in accordance with the average-λ for all sources.

By reason of the foregoing concepts and the manner in which they have been carried out in accordance with the present invention, there has been attained substantial simplification of the circuits for achievement of the loading of all power sources within the range between their upper or lower limits of regulation to produce equal-λ operation.

Figure 1B:
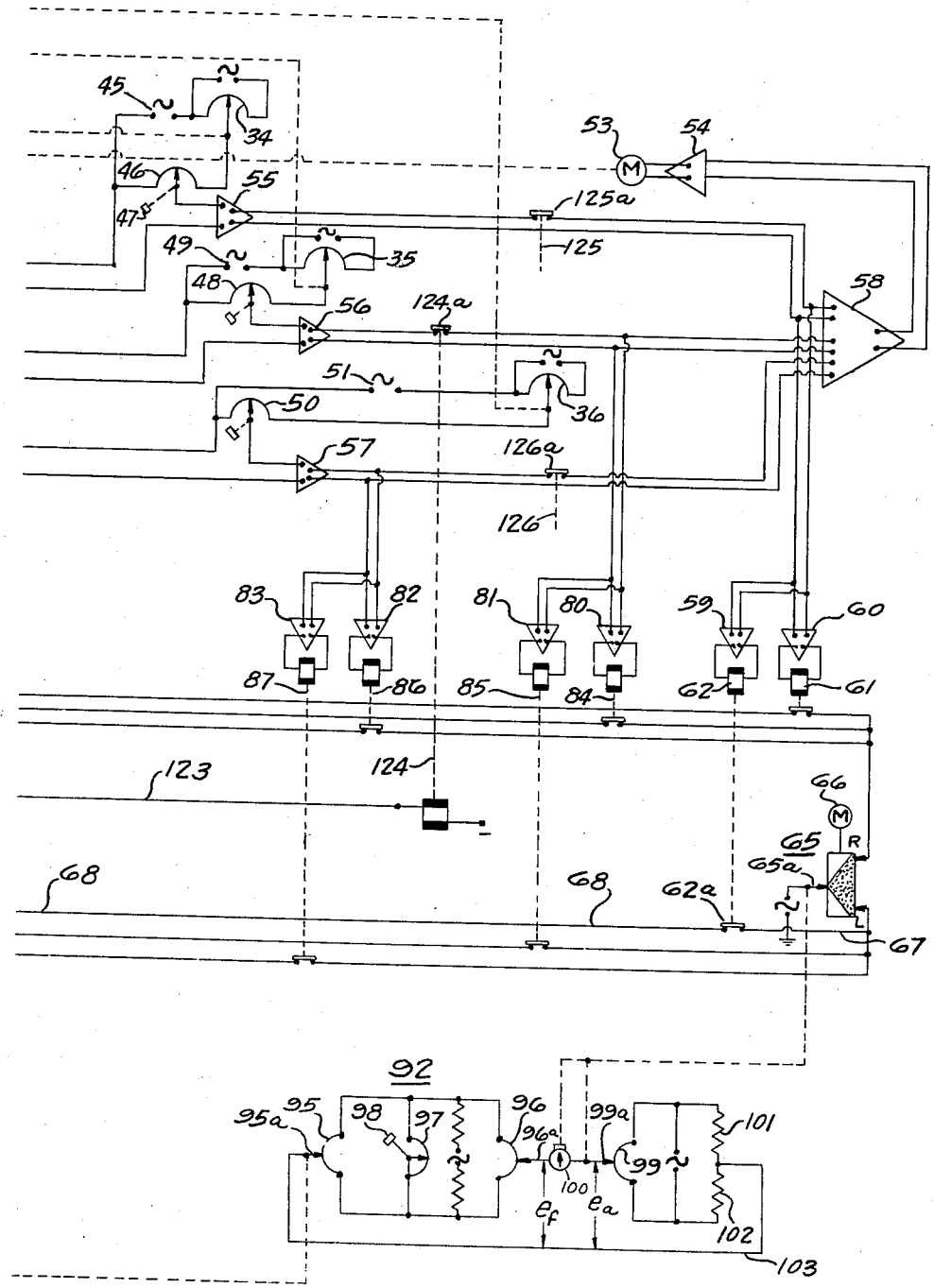

For a more detailed development of the underlying theory, for a description of the additional flexibility provided in accordance with the present invention, and for further objects and advantages of the invention, reference is to be had to the following detailed description taken in conjunction with the accompanying drawings, in which Figs. 1A and 1B together form a schematic diagram of the system embodying the present invention.

Referring to the drawings, the invention in one form has been shown as applied to a relatively simple power generating and distributing system including but three power sources shown as generators 1, 2 and 3 respectively supplying power by way of conductors 11, 12 and 13 to their respective station busses 14, 15 and 16. The station busses are interconnected by power transmission lines of an area A for the supply of power to loads or load centers which have been indicated by the small circles.

The area A may be interconnected by way of tielines (not shown) with other areas with exchange of power between them. The generators may be located in one or in different power stations. As illustrated, the generators are located in different power stations, but to simplify the drawings, only one of a plurality of generators in each power station has been illustrated. The illustrated system has been simplified as much as possible to make easier a full and complete understanding of a system embodying the invention and the manner in which it functions to control the load on the several power sources for delivery of power to the load centers at a minimum total cost.

An inspection of area A will reveal that power supplied to the load centers connected to the transmission lines interconnecting the several station busses may come from any one or all of the generators.

As explained in an A. I. E. E. Technical Paper No. 55-90 entitled, "A General Transmission Loss Equation," made a part hereof by this reference thereto, and jointly authored by me and by Messrs. R. E. Watson and G. L. Smith, the total transmission loss can be expressed by the following equation:

$$P_L = \Sigma_m \Sigma_n P_m B_{mn} P_n + \Sigma_n B_{n0} P_n + K_{L0}$$

where $P_L$ = total transmission loss,
$P_m$ = power of source "$m$,"
$P_n$ = power of source "$n$,"
$B_{mn}$ are constants to be determined; they are dependent on the transmission network (and other factors later to be mentioned),
$B_{n0}$ is a constant representing the incremental loss of each source under the condition of zero system power supply, and
$K_{L0}$ is a constant of integration representing total system losses under the condition of zero system power supply.

To the mathematician, Equation 1 states that the total transmission loss includes a double summation involving only the electrical power outputs of the sources $P_m$ and $P_n$ and the constants $B_{mn}$, a single summation involving the power outputs of the sources $P_n$ and the constants $B_{n0}$, and the constant $K_{L0}$. If the system has ten sources, the $m$ index assumes all values of whole numbers from 1 to 10, and the $n$ index likewise will assume all values of whole numbers from 1 to 10.

Equations of the same type as Equations 4 to 6 of my parent application Serial No. 433,511 are applicable to the present system, and they are as follows:

$$\frac{\partial P_L}{\partial P_1} = 2B_{11}P_1 + 2B_{12}P_2 + 2B_{13}P_3 + B_{10} \quad (2)$$

$$\frac{\partial P_L}{\partial P_2} = 2B_{21}P_1 + 2B_{22}P_2 + 2B_{23}P_3 + B_{20} \quad (3)$$

$$\frac{\partial P_L}{\partial P_3} = 2B_{31}P_1 + 2B_{32}P_2 + 2B_{33}P_3 + B_{30} \quad (4)$$

An examination of each of the foregoing equations reveals that the incremental transmission loss for each of the power sources $P_1$, $P_2$ and $P_3$ is expressed as a ratio, i. e., nondimensional, rather than in kilowatts. It is also important to observe that if the incremental transmission losses are found to be 0.2, by way of example, for the power source $P_1$, it does not mean that under the particular loading conditions 20% of the power is lost in transmission. It does mean, however, that 20% of the next incremental unit of power generated at said source and transmitted to the load will be lost in transmission; and it also means that 20% of the preceding like incremental unit of power generated at said source was lost in transmission. The foregoing illustrates the meaning of incremental transmission loss and suggests that it may rise fairly rapidly with increased power output. Though the total transmission losses for a given level of power output may be only 5% or 6%, yet the incremental transmission loss for a given source at that given level may be much greater than 20%.

Further inspection of Equations 2 to 4 will make apparent the fact that the first term on the right-hand side of each equation includes the generation $P_1$; the second term of each equation has in common the power generation $P_2$; and the third term of each equation has in common the power generation $P_3$. The right-hand side of each equation, besides including power generation, $P_1$, $P_2$ and $P_3$, includes only the "B" constants.

Though any of the computer networks of my aforesaid parent applications may be utilized, there has been illustrated a computing network 17 of the type illustrated in Fig. 4 of my parent application Serial No. 433,511. The respective columns of the matrix comprise transformers 18–21, each with a single primary winding respectively connected to a source of alternating-current supply indicated by the symbol between the respective input terminals. Each transformer has secondary windings, one for each row of the matrix. Thus, transformer 18 includes three secondary windings, each having series resistors 22, 23 and 24, and output resistors 25, 26 and 27. In addition, the transformer 18 as well as transformers 19 and 20 have additional secondary windings utilized for purposes hereinafter to be explained.

While each transformer, such as transformer 18, could be designed with turns ratios to yield output voltages corresponding with $e_{11}$, $e_{21}$ and $e_{31}$ respectively, it is more convenient to provide resistors forming voltage dividers to establish the desired voltages. For example, such resistors 22 and 25 have values to produce the voltage $e_{11}$. The corresponding resistors associated with the secondary windings of each of the transformers have values for producing the remaining voltages labeled $e_{21}$, $e_{31}$, $e_{12}$, etc. It will be noted that in the matrix of the computing network 17, $m$ is the row index and $n$ is the column index. Thus, it will be observed that the voltage $e_{11}$ identifies it as the voltage appearing in the first row and in the first column, while voltage $e_{21}$ corresponds with that needed in the second row and the first column. The voltage $e_{12}$ identifies its position in the first row, second column, and the voltage $e_{33}$ identifies its position in the third row, third column. This nomenclature corresponds with that used in Equations 2 to 4.

The transformers 18, 19 and 20 have their respective primary windings energized in accordance with the potential difference appearing across fractional parts of each of slidewires 28–30 extending to the adjustable contacts thereof. The slidewires 28, 29 and 30 are respectively energized from the alternating-current sources of supply. Each slidewire, a term used herein to refer to an adjustable impedance or resistor forming a potentiometer, has a movable contact adjusted in accordance with the generation at each of the sources 1, 2 and 3. Wattmeters 31, 32 and 33, through the mechanical connections indicated by the broken lines, position the contacts of slidewires 28, 29 and 30, as well as the movable contacts of slidewires 34, 35 and 36 of additional computing networks later to be described. Thus, the slidewires 28–30 provide output voltages representative of the generation levels at the the respective sources and appearing in Equations 2, 3 and 4 as $P_1$, $P_2$ and $P_3$.

As earlier explained, the voltage-dividing resistors across the secondary windings of transformers 18–21 provide the output voltages respectively corresponding with the several terms of each of Equations 2, 3 and 4. These voltages are added together in circuits terminating in slidwires 37–39. For example, the voltage $e_{37}$ represents the algebraic sum of $e_{11} + e_{12} + e_{13} + e_{10}$. The voltage $e_{10}$ has a value which introduces a voltage representative of the last term of Equation 2 and also a voltage representative of unity from which the algebraic sum of the remaining voltages is subtracted. Thus, the voltage $e_{37}$ is representative of the quantity unity minus the incremental transmission losses for source 1. Similarly, corresponding quantities are represented by the voltages $e_{38}$ and $e_{39}$.

It will be recognized that the network 17 provides a solution for the denominator of the following equation:

$$\lambda_{Gm} = \frac{\frac{dF_{Gm}}{dP_{Gm}}}{1 - \frac{\partial P_L}{\partial P_m}} \quad (5)$$

This equation is for lambda ($\lambda$) defined as the incremental cost at the station of power delivered to the load as by a generator G in a station $m$.

A solution for the numerator of Equation 5 is provided by that part of the system which will now be described. The numerator $$\frac{dF_{Gm}}{dP_{Gm}}$$

is representative of the incremental cost of power generation for each source. That expression is derived from the following equations.

Mathematically, the relation between fuel input and generator output of generator G in station $m$ can be expressed by the following relationship:

$$I_{Gm} = \text{input} = a + bP_{Gm} + cP^2_{Gm} \quad (6)$$

where input is expressed as $10^6$ B. t. u. per hour, $P_{Gm}$ = megawatt output for generator G in station $m$, and $a$, $b$, and $c$ are constants.

The foregoing may be converted to incremental input by differentiating, viz:

$$\frac{dI_{Gm}}{dP_{Gm}} = b + 2cP_{Gm} \quad (7)$$

To convert the foregoing equation to incremental cost, it will be assumed that the cost of fuel per million B. t. u. at station $m$ is $f_m$. Accordingly $$\frac{d(f_m I_{Gm})}{dP_{Gm}} = \frac{dF_{Gm}}{dP_{Gm}} = (b + 2cP_{Gm}) f_m \quad (8)$$

As explained more at length in my parent application Serial No. 433,511, particularly column 24 of my Patent No. 2,836,730 which issued thereon, a source 45 has a voltage representative of the "$b$" term of Equation 8, and the voltage derived from the slidewire 34 by way of its movable contact represents "$2cP_1$" (the $2cP_{Gm}$ term of Equation 8). The multiplication of the right-hand side of the above equation by "$f_1$" is accomplished by the slidewire 46 with its contact adjustable as by the knob 47. The setting of the slidewire contact provides any desired fraction of the resultant voltage for developing an output representative of the incremental cost of generation for the then existing cost of fuel.

The output voltage from slidewire 46 is representative of the numerator of Equation 5. Similarly, the output voltage from the slidewire 48 of a corresponding computing network provided for the source 2 is representative of $$\frac{dF_2}{dP_2}$$

This network includes the source 49 having a voltage representative of the "$b$" term of Equation 8. Similarly, the output voltage from slidewire 50 of the network including the source 51 has an output voltage representative of $$\frac{dF_3}{dP_3}$$

In accordance with the present invention, Equation 5 is not utilized as it appears above, and it is not utilized in the same manner as in my parent applications. In accordance with the present invention, advantage is taken of the concept that the incremental cost of delivered power for each station must be equal to the average incremental cost of delivered power for the system, i. e., from all of the sources. Mathematically, then for most economic loading $$\lambda_m = \lambda_{avg} = \frac{\frac{dF_m}{dP_m}}{1 - \frac{\partial P_L}{\partial P_m}} \quad (9)$$

Equation 9 may be written and equated to zero under such conditions of operation that the incremental cost of delivered power ($\lambda$) for any source "$m$" shall be equal to the average value of $\lambda$ for all sources:

$$\lambda_{avg}\left(1 - \frac{\partial P_L}{\partial P_m}\right) - \frac{dF_m}{dP_m} = 0 \quad (10)$$

For the purposes of this application $\lambda_{avg}$ is defined as $$\lambda_{avg} = \frac{\frac{dF_1}{dP_1} + \frac{dF_2}{dP_2} + \cdots + \frac{dF_n}{dP_n}}{\left(1 - \frac{\partial P_L}{\partial P_1}\right) + \left(\frac{\partial P_L}{\partial P_2}\right) + \cdots + \left(1 - \frac{\partial P_L}{\partial P_n}\right)} \quad (10a)$$

which becomes $$\lambda_{avg} = \frac{\lambda_1 + \lambda_2 + \cdots + \lambda_n}{n} \quad (10b)$$

when $\lambda_1 = \lambda_2 = \cdots = \lambda_n = \lambda_{avg}$.

The advantage of utilizing Equation 10 is that the control system may be materially simplified as compared with certain of the systems disclosed in my parent applications. More particularly, in the present system there is utilized the concept of the average-$\lambda$ for the system without the need for separate computation of $\lambda$ for each of the sources. This is accomplished by providing the slide-wires 37–39 to which there are respectively applied the voltages $e_{37}$–$e_{39}$ and taking from the slidewires 37–39 fractional parts of each voltage. For this purpose, the contacts of each of the slidewires 37–39 are mechanically connected together and simultaneously adjusted as by the mechanical connection, indicated by the broken line 52, driven by a motor 53 under the control of a servo-amplifier 54. The respective output voltages from slidewires 37–39 correspond with the respective products of the first term of Equation 10. From the respective products there are respectively subtracted in the combining circuits the output voltages from slidewires 46, 48 and 50, each representative of $$\frac{dF}{dP}$$

for the respective sources 1–3.

For given levels of generation at sources 1–3, it will first be assumed that the lambdas are different. Accordingly, the voltage representative of the indicated product for the first term of Equation 10 will not be equal to the voltage representative of $$\frac{dF}{dP}$$

As a result, there will be difference voltages applied to isolation amplifiers 55–57, and potential differences will appear across the output circuits of the respective amplifiers. These amplifiers preferably have unity gain. The outputs from the amplifiers 55–57 are applied to an adding means shown as a summing amplifier 58. Some of the output voltages or signals will be of one sign and some of an opposite sign depending upon whether the lambda for a source exceeds or is less than the average lambda. The algebraic sum of the output voltages is applied by amplifier 58 to the input of the servo-amplifier 54 which energizes the motor 53 for rotation in a direction to drive the slidewire contacts of slidewires 37–39 in a direction to reduce to zero the output voltage of the summing amplifier 58. This will be acomplished when the output voltages from amplifiers 55–57 balance each other or add up to zero. In this connection, the reference to positive and negative values refers to the instantaneous polarity or phase of the ouput voltages. As already stated, they will be of one phase or of one sign depending upon whether the lambdas of the respective sources are above or below the average-$\lambda$ for all sources.

It will be assumed that the incremental cost of delivered power for the source 1 is greater than the incremental cost of delivered power from the sources 2 and 3. Accordingly, the output voltage from amplifier 55 as applied to the input circuits of amplifiers 59 and 60 will be effective through amplifier 60 to energize a relay 61 to interrupt the circuit for the "raise" pulses of source 1. However, "lower" pulses may flow by way of contacts 62a of a relay 62 which remains in its deenergized position to decrease generation of source 1 and the lambda of that source.

It will be understood by those skilled in the art, and in accordance with my parent application Serial No. 433,511, that the amplifiers 59 and 60 are selectively responsive to the polarity of the output voltage from amplifier 55; more particularly, they respectively respond when the output voltage is in phase or out of phase with their alternating current bias voltages. In brief, when the input voltage or signal is of one polarity or phase, the amplifier 60 energizes relay 61 and when of the opposite polarity or phase, the amplifier 59 energizes the relay 62.

"Lower" pulses from a pulse generator 65 driven by a motor 66 are then routed by way of a conductor 67, contacts 62a, conductor 68, and contacts of a relay 69, to a "lower" winding of a motor 70 for energization of that motor in a direction to adjust the generation-control 64 to reduce the level of generation of source 1. The generation-control 64 is diagrammatically illustrated as including a threaded shaft 71 which drives a traveling nut 72 to change the tension of a spring 73 applied to a governor 74 which serves to adjust a throttle valve 75 of a turbine 76. The increased closure of the valve 75 reduces the output of turbine 76 and thus reduces the generation of the source or generator 1. As the generation is decreased, its incremental cost of delivered power decreases. Thus, the change represents a correction as needed to bring the incremental cost of generation of source 1 nearer the average value for all sources.

Concurrently with the foregoing operations, the output voltages from amplifiers 56 and 57 are similarly effective through amplifiers 80–83 to control the energization of relays 84–87. It can be further assumed that the values of lambda for sources 2 and 3 are less than the average value of lambda. The relays 85 and 87 will be energized for the routing of "raise" pulses through the contacts of relays 84 and 86 to the "raise" motor windings of motors 88 and 89 of generation-control systems 90 and 91. Thus, these motors adjust the governors to increase the generation of sources 2 and 3 as "raise" pulses are applied to the respective motors 88 and 89.

It will be helpful at this point to explain that in the operation of an interconnected system, the load on the system is constantly changing, and through a control network 92 the movable contact of the pulse generator 65 will produce "raise" pulses and "lower" pulses in accordance with the area requirement, i. e., the generation change needed to supply the then existing load. During such changes of load, the generation of source 1 will be decreased, and the generation of sources 2 and 3 will be increased. Through computer network 17, there will be concurrently computed new values for the quantities unity minus incremental transmission losses. Thus, the voltages $e_{37}$–$e_{39}$ will be changed. There will likewise be changing the output voltages from slidewires 46, 48 and 50 representative of $$\frac{dF}{dP}$$

for the three sources. It will be obvious that the output voltages from amplifiers 55–57 will change, and the servo-amplifier 54 will energize motor 53 to readjust the positions of the contacts of slidewires 37–39. This will provide new values for the fractional voltages derived from slidewires 37–39. These will be changed in directions to correspond with the change in lambda for each particular source, bringing it nearer to the value of $\lambda$-average. When the generation of each of the sources 1–3 has values which make the respective incremental costs of delivered power equal to the average for all sources, the amplifiers 55–57 will each have zero output. At that time the positions of the contacts on slidewires 37–39 will be representative of the actual lambda for the respective sources. The value of lambda for each source will be equal to each other and equal to average-$\lambda$.

The pulse generator 65 is under the control of area-requirement network 92 of the same general type as described in U. S. Patent No. 2,688,728 to Carolus, dated September 7, 1954. A frequency-responsive meter 94 connected to the station bus 16 of area A adjusts a slidewire contact 95a of a slidewire 95 connected to the area-requirement network 92. The left-hand side of this network includes a slidewire 96 having a contact 96a set at a point representing the desired frequency to be maintained on the system as a whole and which will usually be for the commercial frequency of 60 cycles per second. The left-hand portion of the network is energized from the indicated alternating-current source of supply as through series resistors and includes in a separate branch a rheostat 97 having its contact adjustable by a knob 98 to provide the desired magnitude of an output voltage $e_f$ for a given change of position of slidewire contact 95a. The right-hand portion of the area-requirement network 92 includes a slidewire 99 with its contact 99a adjustable by a detector 100 responsive to the difference between the voltages $e_f$ and $e_a$. The voltage $e_a$ is derived from the slidewire 99 energized from the indicated alternating-current supply, there being two equal resistors 101 and 102 between which a connection is made from slidewire contact 95a by way of a conductor 103. The area-requirement network 92 provides for adjustment of contact 65a of the pulse generator by an amount representative of a desired change in generation. Such a change in the position of contact 65a will be due to the load change on the system which produced a frequency variation as indicated by the frequency meter 94. When the change in generation has been accomplished, the frequency will have been returned to its selected value of 60 cycles per second. More particularly, the detector 100 through the mechanical connection adjusts slidewire contact 99a in a network-balancing direction and concurrently moves the contact 65a of the impulse generator 65 upwardly or downwardly for production of "raise" and "lower" pulses. As the generation changes, contact 65a is returned to its illustrated position.

In accordance with a further feature of the present invention, account is taken of operating conditions and particularly constraints arising in the operation of the sources. For every power source, there will be desired upper and lower generator limits. Between these limits changes of generation can be made by the control system which has just been described. When one of the regulating limits is attained by a particular power source, it is desirable to remove that power source from the computations for average-$\lambda$. This is readily accomplished in conjunction with the limit circuits respectively energized by the lowermost secondary windings of transformers 18–20. For the source 1 the lowermost secondary winding applies to a limit-network a voltage representative of the generation for source 1. The limit-network includes two potentiometers 105 and 106 with slidewire contacts respectively positioned to points corresponding with the selected upper and lower limits for source 1. When an upper limit is reached, a difference voltage applied to an amplifier 107 energizes a relay 108 to open the circuit to the raise winding of the motor 70. When a lower limit is reached, an amplifier 109 energizes the relay 69 to open the circuit for "lower" impulses to the motor 70. Similar potentiometers 110–113, similar amplifiers 114–117, and similar relays 118–121 are provided for the sources 2 and 3.

It will be now assumed that the source or generator 2 has reached or exceeded its selected upper limit. The amplifier 114 energizes the relay 118 which opens its contacts in series with the raise winding of motor 88. At the same time, the normally open contacts of relay 118 are closed. This completes an energizing circuit which may be traced from one side of a source of supply indicated by a positive sign by way of normally open contacts, conductors 122 and 123 to the operating winding of a relay 124, one side of which is connected to the other side of the source of supply as indicated by the negative sign. The relay 124 is thereupon energized to open its contacts 124a to interrupt the circuit extending from the amplifier 56 to the summing amplifier 58. Thus, concurrently with the operation of the limit relay 118, there is removed the effect in the computation of the average-λ of the power generation from source 2.

It will be obvious from an inspection of the circuit that when source 2 reaches or falls below a lower limit, the relay 119 is energized and through its normally open contacts, which are then closed, energizes the relay 124 again to open the contacts 124a for the purposes just stated. In a similar manner, corresponding normally open contacts are provided for relays 69, 108, 120 and 121 which energize relays for the opening of normally closed contacts 125a and 126a of relays 125 and 126. To simplify the drawings, the operating coils and normally open contacts of the aforesaid relays have been omitted. The contacts 125a and 126a are operated to remove from the calculation of average-λ the lambdas of the sources 1 and 3 whenever either of such sources reaches or exceeds an upper or lower limit of regulation. In this connection, it is to be noted that while the difference voltages which would normally be applied to the summing amplifier are removed when any source reaches or exceeds one of its limits of regulation, nevertheless the generation level for each such source continues to be effective in the computing network 17 for the attained level of generation. This factor is necessary inasmuch as the level of generation of each source affects the transmission losses of all sources.

Now that the principles of the present invention have been set forth with some particularity, it is to be understood that variations may be made in systems embodying the present invention and within the scope of the appended claims. For example Equation 10 may be rewritten as follows:

$$\left(1-\frac{\partial P_L}{\partial P_m}\right)-\frac{\frac{dF_m}{dP_m}}{\lambda_{avg}}=0 \tag{11}$$

Equation 11 is the same as Equation 10 except that $\lambda_{avg}$ has been moved to be the denominator of the second term of the left-hand side of the equation, as by division of both sides of Equation 10 by $\lambda_{avg}$. With Equation 11 applicable, the slidewires 37, 38 and 39 will be moved to positions where the voltages derived from slidewires 46, 48 and 50 are respectively applied directly to them. The fractional voltages then derived from slidewires 37, 38 and 39 will be representative of $$\frac{\frac{dF_m}{dP_m}}{\lambda_{avg}}$$

As to the values of the resistors selected in the computing networks, those skilled in the art will understand how to compute them, having available the aforesaid paper entitled, "A General Transmission Loss Equation." As exemplary of "B" constants computed for three typical sources, reference may be had to the following table, the "B" constants shown having been ascertained in accordance with the Brownlee-Early method of my parent application, Serial No. 433,511:

|  | Constant | Source 1 | Source 2 | Source 3 |
|---|---|---|---|---|
| The Self-Constants | $B_{11}$ | +.041537 |  |  |
|  | $B_{22}$ |  | +.074623 |  |
|  | $B_{33}$ |  |  | +.633436 |
| The Mutual Constants | $B_{12}$ | −.012141 |  |  |
|  | $B_{21}$ |  | −.010510 |  |
|  | $B_{13}$ | −.069470 |  |  |
|  | $B_{31}$ |  |  | −.084222 |
|  | $B_{23}$ |  | −.093904 |  |
|  | $B_{32}$ |  |  | −.118413 |
| The Added Constants | $B_{10}$ | −.001548 |  |  |
|  | $B_{20}$ |  | −.000665 |  |
|  | $B_{30}$ |  |  | +.000322 |

Further typical values for the "B" constants for three power sources have also been provided in the aforesaid paper entitled "A General Transmission Loss Equation," their values being as follows:

*Value of loss equation constants*

$B_{11}=\phantom{-}0.016576$    $B_{21}=-0.010204$    $B_{31}=-0.013611$
$B_{12}=-0.010204$    $B_{22}=\phantom{-}0.021871$    $B_{32}=\phantom{-}0.002477$
$B_{13}=-0.013611$    $B_{23}=\phantom{-}0.002477$    $B_{33}=\phantom{-}0.016792$
$B_{10}=-0.026961$    $B_{20}=\phantom{-}0.027215$    $B_{30}=\phantom{-}0.025327$

What is claimed is:

1. In a power system including a plurality of interconnected transmission lines to which there are connected a plurality of sources of power, the combination of means for generating a signal for each of said sources representative of and varying with the quantity unity minus the incremental transmission losses, means for producing for each said source a signal representative of and varying with the incremental cost of generation, an equal-λ adjustable impedance for each said source to which one of said signals for each said source is applied for obtaining a fractional signal for each said source, means including a combining circuit for each said power source for combining said fractional signal and the other of said signals for said source, said signal varying with said incremental cost of generation having in said combining circuit an instantaneous polarity opposite to that of said signal varying with said quantity for producing an output signal, adding means for algebraically adding said output signals, and means responsive to the sum of said output signals for adjusting said equal-λ impedance in a direction to reduce said sum to zero.

2. The system of claim 1 in which there are provided means for excluding from said adding means said output signal from each said source operating at either an upper or a lower limit of the regulation thereof.

3. The system of claim 1 in which there is provided a signal generator for developing raise-signals and lower-signals, and means for each said power source responsive to the polarity of said output signal for said source for applying raise-signals to said source for increasing the generation thereof and responsive to an opposite polarity of said output signals for decreasing the generation of said power source.

4. A system for varying the generation of a plurality of sources of power interconnected by transmission lines which comprises means for generating a signal representative of and varying with the quantity unity minus the incremental transmission losses for each said source, means for producing a signal representative of and varying with the incremental cost of generation for each said source, an equal-λ adjustable impedance for each said source to which one of said signals for each said source is applied for obtaining a fractional signal for each said source, means including a combining circuit for each said power source for combining said fractional signal and the other of said signals for said source, said signal varying with said incremental cost of generation having in said combining circuit an instantaneous polarity opposite to that of said signal varying with said quantity for producing an output signal, adding means for algebraically adding output signals, and means responsive to the sum of said output signals for adjusting said equal-λ impedances in a direction to reduce said sum to zero.

5. The system of claim 4 in which said means for generating said signals representative of the quantity unity minus the incremental transmission losses and said means for producing said signals representative of the incremental cost of generation respectively include an adjustable impedance, and means responsive to change in generation of each of said sources for varying said impedances.

6. The system of claim 4 in which said means for generating said signals representative of the quantity unity minus the incremental transmission losses and said means for producing said signals representative of the incremental cost of generation respectively include an adjustable impedance, means responsive to change in generation of each of said sources for varying said impedances, a signal generator for developing raise-signals and lower-signals, and means for each said power source respectively responsive to the polarity of said output signals for said sources for applying raise-signals to said sources for increasing the generation thereof and responsive to an opposite polarity of said output signals for decreasing the generation of said power sources.

7. A system for regulating the generation of a plurality of sources of power interconnected by transmission lines which comprises means for generating a signal for each of said sources representative of and varying with the quantity unity minus the incremental transmission loss, means for producing for each said source a signal representative of and varying with the incremental cost of generation, an equal-λ adjustable impedance for each said source to which said quantity is applied for obtaining a product-signal for each said source, means including a combining circuit for each said power source for subtracting from said product-signal said signal representative of said incremental cost of generation for producing an output signal, adding means for algebraically adding said output signals, and means responsive to the sum of said output signals for adjusting said equal-λ impedances in a direction to reduce said sum to zero, said adjustable impedances when said sum has been reduced to zero having values representative of the average value of incremental cost of delivered power from said sources.

8. A system of regulating the generation of a plurality of sources of power interconnected by transmission lines for operation of said sources with substantially the same incremental cost of delivered power comprising means including an impedance network for generating a signal for each of said sources representative of and varying with the quantity unity minus the incremental transmission losses, means including an impedance network for producing for each said source a signal representative of and varying with the incremental cost of generation, an equal-λ adjustable impedance for each said source to which one of said signals for each said source is applied for obtaining a fractional signal for each said source, means including a combining circuit for each said power source for combining said fractional signal and the other of said signals for said source, said signal varying with said incremental cost of generation having in said combining circuit an instantaneous polarity opposite to that of said signal varying with said quantity for producing an output signal having an instantaneous polarity depending upon the relative magnitudes of said combining signals, adding means for algebraically adding said output signals, and means responsive to the sum of said output signals for adjusting said equal-λ impedances in a direction to reduce said sum to zero, said adjustable impedances when said sum has been reduced to zero having values representative of the average-λ for said sources corresponding with the average incremental costs of delivered power from said sources, said combining signals when said generation of said sources is not distributed in accordance with said average-λ having differing polarities whose sum is zero, said output signal for each said source being zero when said incremental cost of delivered power for each said source corresponds with said average value of lambda.

9. A system of regulating the generation of a plurality of sources of power interconnected by transmission lines for operation of said sources with substantially the same incremental cost of delivered power comprising means including an impedance network for generating a signal for each of said sources representative of and varying with the quantity unity minus the incremental transmission losses, means including an impedance network for producing for each said source a signal representative of and varying with the incremental cost of generation, an equal-λ adjustable impedance for each said source to which one of said signals for each said source is applied for obtaining a fractional signal for each said source, means including a combining circuit for each said power source for combining said fractional signal and the other of said signals for said source, said signal varying with said incremental cost of generation having in said combining circuit an instantaneous polarity opposite to that of said signal varying with said quantity for producing an output signal having an instantaneous polarity depending upon the relative magnitudes of said combining signals, adding means for algebraically adding said output signals, means responsive to the sum of said output signals for adjusting said equal-λ impedances in a direction to reduce said sum to zero, said adjustable impedances when said sum has been reduced to zero having values representative of the average-λ for said sources, said combining signals when said generation of said sources is not distributed in accordance with said average-λ having differing polarities whose sum is zero, said output signal for each said source being zero when said incremental cost of delivered power for each said source corresponds with said average value of lambda, and means responsive to said output signals for each said source for changing the generation of said source until its incremental cost of delivered power equals said average value of lambda.

10. The system of claim 9 in which there are provided means for excluding from said adding means said output signal from each said source operating at either an upper or lower limit of the regulation thereof.

No references cited.

UNITED STATES PATENT OFFICE
Certificate of Correction

Patent No. 2,871,375                                                     January 27, 1959

Edwards D. Early

It is hereby certified that error appears in the printed specification of the above numbered patent requiring correction and that the said Letters Patent should read as corrected below.

Column 1, line 59, for "unit" read —unity—; column 6, lines 9 to 11, Equation 10a, lower left-hand portion, for:

$$\left(1\frac{\partial P_L}{\partial P_1}\right)+\left(\frac{\partial P_L}{\partial P_2}\right)+ \quad\quad \text{read} \quad\quad \left(1-\frac{\partial P_L}{\partial P_1}\right)+\left(1-\frac{\partial P_L}{\partial P_2}\right)+$$

column 7, line 20, for "and" read —the—.

Signed and sealed this 16th day of August 1960.

[SEAL]

Attest:

KARL H. AXLINE,                                                                ROBERT C. WATSON,
*Attesting Officer.*                                                                     *Commissioner of Patents.*